United States Patent
Hiraga et al.

(10) Patent No.: US 8,331,950 B2
(45) Date of Patent: Dec. 11, 2012

(54) MOBILE COMMUNICATION SYSTEM, RADIO NETWORK CONTROLLER AND METHOD

(75) Inventors: Teruaki Hiraga, Chofu (JP); Yasuhiro Kawabe, Yokosuka (JP); Atsuo Horibe, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/163,030

(22) Filed: Jun. 17, 2011

(65) Prior Publication Data

US 2011/0312313 A1 Dec. 22, 2011

(30) Foreign Application Priority Data

Jun. 18, 2010 (JP) ................................. 2010-139131

(51) Int. Cl.
*H04W 28/02* (2009.01)

(52) U.S. Cl. ...................... 455/453; 455/428; 455/452.1; 370/332

(58) Field of Classification Search .......... 455/418–420, 455/422.1, 432.1–435.3, 445–453, 436; 370/236, 370/237, 329–338, 341, 431
See application file for complete search history.

(56) References Cited

U.S. PATENT DOCUMENTS

| | | | |
|---|---|---|---|
| 2001/0028638 A1* | 10/2001 | Walton et al. | 370/335 |
| 2002/0034951 A1* | 3/2002 | Salonaho et al. | 455/453 |
| 2002/0193118 A1* | 12/2002 | Jain et al. | 455/453 |
| 2008/0137536 A1* | 6/2008 | Hede | 370/236 |
| 2011/0058480 A1* | 3/2011 | Dahlen | 370/237 |
| 2011/0170415 A1* | 7/2011 | Johnson et al. | 370/236 |
| 2011/0223918 A1* | 9/2011 | Dahlen et al. | 455/436 |

FOREIGN PATENT DOCUMENTS

| | | |
|---|---|---|
| JP | 2007-312434 | 11/2007 |
| JP | 2008-124799 | 5/2008 |
| JP | 2009-141826 | 6/2009 |
| WO | WO 2006/104337 A1 | 10/2006 |

OTHER PUBLICATIONS

Extended European Search Report issued Nov. 2, 2011, in European Patent Application No. 11170570.3.
3rd Generation Partnership Project; Technical Specification Group Services and System Aspects, "Intra-domain connection of Radio Access Network (RAN) nodes to multiple Core Network (CN) nodes, (Release 8)" 3GPP TS 23.236 V8.1.0, Dec. 2009, 39 pages.
3rd Generation Partnership Project; Technical Specification Group Radio Access Network, "Radio Resource Control (RRC) Protocol specification" (Release 8), 3GPP TS 25.331 V8.10.0, Mar. 2010, 1,726 pages.
Office Action issued Apr. 10, 2012 in Japanese Application No. 2010-139131 (With English Translation).

* cited by examiner

*Primary Examiner* — Kamran Afshar
*Assistant Examiner* — Kashif Siddiqui
(74) *Attorney, Agent, or Firm* — Oblon, Spivak, McClelland, Maier & Neustadt, L.L.P.

(57) ABSTRACT

A radio network controller connected to multiple exchanges in a mobile communication system includes an exchange side interface configured to communicate with the multiple exchanges, a mobile station side interface configured to receive a call connection signal from a mobile station via a radio base station, a management unit configured to manage congestion levels indicative of congestion states of the respective exchanges and a control unit. The exchange side interface acquires the congestion levels from the respective exchanges, and the control unit determines to transfer a predefined ratio of call connection signals destined for an exchange having a higher congestion level to an exchange having a lower congestion level, the ratio being predefined corresponding to the congestion level.

7 Claims, 10 Drawing Sheets

FIG.3

| DOMAIN | CN | NRI | |
|---|---|---|---|
| | | DECIMAL NUMBER | BINARY NUMBER |
| CS | MSC30 | 0 | 00000000 |
| | MSC31 | 1 | 00000001 |
| | MSC32 | 2 | 00000010 |
| PS | SGSN20 | 0 | 00000000 |
| | SGSN21 | 1 | 00000001 |
| | SGSN22 | 2 | 00000010 |

FIG.10

| CALL TYPE | REROUTE INITIATION CONGESTION LEVEL |
|---|---|
| PATTERN A | 10% |
| PATTERN B | 50% |
| PATTERN C | 90% |
| PATTERN D | – |

MOBILE COMMUNICATION SYSTEM, RADIO NETWORK CONTROLLER AND METHOD

BACKGROUND OF THE INVENTION

1. Field of the Invention

The present invention relates to a mobile communication system, a radio network controller and a method.

2. Description of the Related Art

A W-CDMA system includes a radio access network (RAN) mainly responsible for performing radio access control and a core network (CN) responsible for performing mobility management, call control, service control and so on. The RAN includes a radio network controller (RNC) and a radio base station (NodeB). The CN includes a circuit switched (CS) domain and a packet switched (PS) domain. In general, the CS domain provides voice related services while the PS domain provides data communication related services. As nodes for serving mobile stations in the respective domains, a mobile-services switching center (MSC) and a serving GPRS support node (SGSN) are provided in the CS domain and the PS domain, respectively. The MSC and the SGSN have interfaces to the RNC, and the interfaces between the RNC and the MSC/SGSN are referred to as Iu interfaces.

In a conventional prevailing network, a single exchange (MSC/SGSN) controls the RNC. In the case of multiple CN nodes (exchanges) within a domain, if the RNC can select one of the multiple CN nodes within the domain at the time of call connection, it would be possible to distribute load within the CN. Also, in the case of failure of a certain CN node in the domain, if another CN node is available, it would be possible to improve redundancy of the CN nodes without interrupting the call connection. From these viewpoints, 3GPP standard specification defines a scheme for enabling the RNC to determine a connecting CN node in a network where multiple CN nodes are included in a domain. This scheme is referred to as Iu-Flex. For reference, see 3GPP TS 23.236 V8.1.0 (2009-12) and 3GPP TS 25.331 V.8.10.0 (2010-03), for example.

In an Iu-Flex based network configuration, subscriber profiles for mobile stations are distributed and accommodated among multiple CN nodes. If call connections or location registration traffic is concentrated on one or several of the CN nodes due to some factors, these CN nodes would become congested and accordingly could not continue to operate normally. Also, the CN nodes within a pool area may be arranged to have different processing capabilities due to some reasons such as facility investment policies. In this case, a CN node having a relatively lower processing capability may be likely to fall into a congestion state and accordingly may not be able to continue normal operations. The term "pool area" used herein means an area to accommodate multiple CN nodes connected to a single RNC.

If a congested CN node receives a location registration request from a mobile station, the CN node would issue a TMSI and/or a P-TMSI including an NRI (Network Resource Identifier) having an invalid value to the mobile station. Thus, when the mobile station issues another location registration request at the next time, the NRI would indicate the invalid value in an RRC message (Initial Direct Transfer). Upon detecting that the NRI has the invalid value, the RNC selects a CN node from available CN nodes randomly and transmits a location registration request signal to the selected CN node. In this manner, the transmission of the location registration request signal to the congested CN node can be avoided, and the RNC can connect to other CN nodes. As a result, it is possible to redistribute load among the CN nodes.

In the above-mentioned manner, however, since the congested CN node transmits the invalid NRI value in response to receipt of the location registration request, the load redistribution would not be available until the next occasion of the location registration. In other words, the RNC would have to transmit the location registration request signal to the congested CN node at least once. For this reason, the above-mentioned method is disadvantageous in that the load on the congested CN node cannot be redistributed immediately. Also, the congested CN node has to set the invalid NRI value in the TMSI and/or P-TMSI and issue the TMSI and/or P-TMSI, which may increase processing load of the CN nodes.

In addition, if the mobile station attempts to initiate communication after the transmission of the TMSI and/or the P-TMSI having the invalid NRI value before completion of the next location registration, the NRI in a signal transmitted by the mobile station would be invalid. Since the RNC has no knowledge of the CN node accommodating that mobile station, the RNC would select the CN node randomly. For this reason, there is a higher likelihood that the signal may be transmitted to a non-congested ON node. On the other hand, a connection request would be issued to the CN node having no subscriber information for the mobile station, which leads to connection failure.

Furthermore, in the Iu-Flex scheme, even if the CN node is in the congestion state, a normal connection request from a mobile station, whose location has not been registered yet, would be transmitted to the congested CN node. This is because the location registration triggers the load redistribution in accordance with the above-mentioned load redistribution scheme.

Accordingly, the conventional load redistribution scheme has no immediate effect. If the processing capability approaches the limit and accordingly the load has to be reduced immediately, the conventional load redistribution cannot follow it.

SUMMARY OF THE INVENTION

One object of the present invention is to initiate the load redistribution among multiple exchanges immediately in the case where at least one of the multiple exchanges connected to the RNC is congested.

An aspect of the present invention provides a radio network controller connected to multiple exchanges in a mobile communication system, comprising: an exchange side interface configured to communicate with the multiple exchanges; a mobile station side interface configured to receive a call connection signal from a mobile station via a radio base station; a management unit configured to manage congestion levels indicative of congestion states of the respective exchanges; and a control unit, wherein the exchange side interface acquires the congestion levels from the respective exchanges, and the control unit determines to transfer a predefined ratio of call connection signals destined for an exchange having a higher congestion level to an exchange having a lower congestion level, the ratio being predefined corresponding to the congestion level.

According to the above aspect of the present invention, if at least one of multiple exchanges connected to an RNC is congested, load redistribution among the multiple exchanges can be made immediately.

BRIEF DESCRIPTION OF THE DRAWINGS

FIG. 3 illustrates exemplary NRIs of CN nodes;

FIG. 10 illustrates exemplary correspondence between call types and reroute initiation levels.

DESCRIPTION OF THE PREFERRED EMBODIMENTS

Embodiments of the present invention are described in detail below. According to the embodiments, an RNC can know a congestion state of a CN node and accordingly can reduce the amount of signals transmitted to the congested CN node appropriately. In addition, even if multiple CN nodes are congested, load redistribution can be made appropriately in consideration of load levels of the CN nodes.

[1. Iu-Flex]

Prior to describing an RNC and exemplary operations according to embodiments of the present invention, an Iu-Flex scheme applied to the embodiments is described below.

In the Iu-Flex scheme, as stated above, multiple core network (CN) nodes are connected to a single RNC to improve load distribution and fault tolerance. When the RNC connects a call requested by a mobile station, that is, at the time of call connection, the RNC determines which CN node or serving CN node controls the call. The serving CN node is a CN node that retains a subscriber profile for that call. The subscriber profile includes user subscriber information and others for the requesting mobile station. Identifiers are assigned to the CN nodes. The identifiers can be used in CS and PS domains to uniquely identify the CN nodes within a pool area. The identifier is referred to as an NRI (Network Resource Identifier). The pool area represents multiple CN nodes connected to the single RNC.

Figure 1:
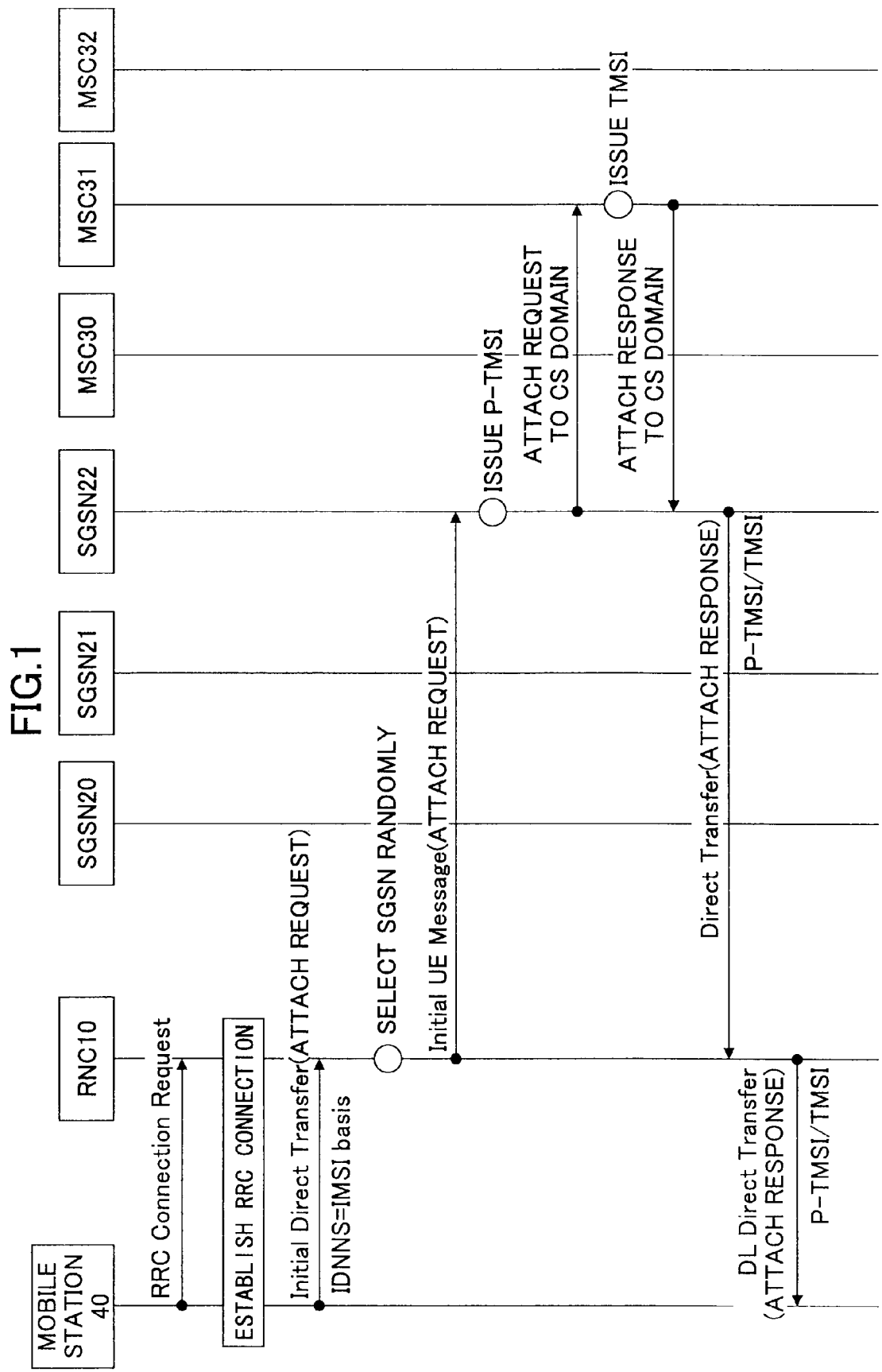
FIG. 1 is a sequence diagram illustrating an attach procedure by a mobile station in an Iu-Flex based network.

FIG. 1 is a sequence diagram illustrating an attach procedure by a mobile station in an Iu-Flex based network. An RNC 10 is connected in upstream to SGSNs 20-22 and MSCs 30-32 and in downstream to the mobile station 40. The mobile station 40 may be any appropriate user equipment having radio communication capabilities. The mobile station 40 may be, but not limited to, a mobile phone, an information terminal, a PDA (Personal Digital Assistant), a mobile personal computer or others.

In order to conduct the attach procedure, the mobile station 40 needs to establish an RRC connection (radio connection) to the RNC 10. To this end, the mobile station 40 transmits an RRC connection request to establish the RRC connection. The RNC 10 transmits a message to instruct the mobile station 40 to establish the RRC connection. This message is referred to as an RRC Connection Setup.

After the establishment of the RRC connection, the mobile station 40 transmits an attach request signal to the RNC 10 (Initial Direct Transfer). At this time, an information element referred to as an IDNNS (Intra Domain NAS Node Selector) is set in the attach request signal. The IDNNS includes 10-bit sequence information generated based on any of a TMSI, a P-TMSI, an IMSI and an IMEI as identification information for identifying the mobile station 40 in a network. The IDNNS further includes information for indicating which of the TMSI, the P-TMSI, the IMSI and the IMEI is used to generate the 10-bit information. The 10-bit sequence information in the IDNNS may be referred to as a routing parameter. The TMSI, the P-TMSI, the IMSI and the IMEI may be used in the order of descending priorities. In general, the TMSI and the P-TMSI are IDs issued by exchanges. The TMSI (Temporary Mobile Subscriber Identifier) is an identifier issued by an exchange in the CS domain. The P-TMSI (Packet TMSI) is an identifier issued by an exchange in the PS domain. The IMSI and the IMEI are identifiers uniquely assigned to subscribers and/or terminals beforehand. The IMSI (International Mobile Subscriber Identifier) is a subscriber identifier uniquely assigned to a user. The IMEI (International Mobile Equipment Identifier) is a terminal identifier uniquely assigned to a mobile station. At the attach timing, the TMSI and the P-TMSI have not been issued yet, and accordingly only the IMSI and the IMEI are available. In the illustrated embodiment, the IMSI is set to the IDNNS in the attach request signal.

In response to receipt of the attach request signal (call request from the mobile station), the RNC 10 determines a serving CN node for the mobile station. The routing parameter (IDNNS) in the attach request signal is set to the IMSI. At the attach timing, no connecting exchange has been determined yet, and the subscriber profile for the mobile station has not been registered in any exchange. For this reason, the RNC 10 selects a CN node randomly. The attach procedure generally runs in the PS domain. In the illustrated embodiment, the RNC 10 selects the SGSN 22 and transfers the attach signal received from the mobile station 40 to the SGSN 22 (Initial UE Message).

In response to receipt of the attach signal, the SGSN 22 generates the subscriber profile for the requesting mobile station and issues the P-TMSI. The NRI (PS-NRI) for the SGSN 22 is embedded in the P-TMSI. Specifically, the NRI for the SGSN 22 is embedded in 10 bits from the 14th bit to the 23rd bit of the P-TMSI. For example, assuming that the NRIs of the SGSNs 20-22 are "0", "1" and "2", respectively, the P-TMSI issued by the SGSN 22 would include information "NRI=2" ("10" in binary representation).

Next, the SGSN 22 selects one of the multiple exchanges MSCs 30-32 to conduct the attaching to the CS domain. In this case, the subscriber profile for the mobile station has not been yet registered in any of the MSCs (due to non-determination of the serving MSC), the SGSN 22 would select any MSC randomly. In the illustrated embodiment, the SGSN 22 selects the MSC 31 and transmits an attach request signal for the CS domain to the MSC 31.

The MSC 31 generates the subscriber profile for the attaching mobile station and issues the TMSI. The NRI (CS-NRI) for the MSC 31 is embedded in the TMSI. More specifically, the NRI of the MSC 31 is embedded in 10 bits from the 14th bit to the 23rd bit of the TMSI. For example, assuming that the NRIs of the MSCs 30-32 are "0", "1" and "2", respectively, the TMSI issued by the MSC 31 would include information "NRI=1" ("01" in binary representation).

The issued TMSI is transmitted from the MSC 31 to the SGSN 22.

The SGSN 22 indicates the P-TMSI and the TMSI to the RNC 10 in an attach response signal (Direct Transfer). The RNC 10 transfers the attach response signal to the mobile station 40 (DL Direct Transfer).

In this manner, the TMSI and the P-TMSI can be issued through the attach procedure.

Figure 2:
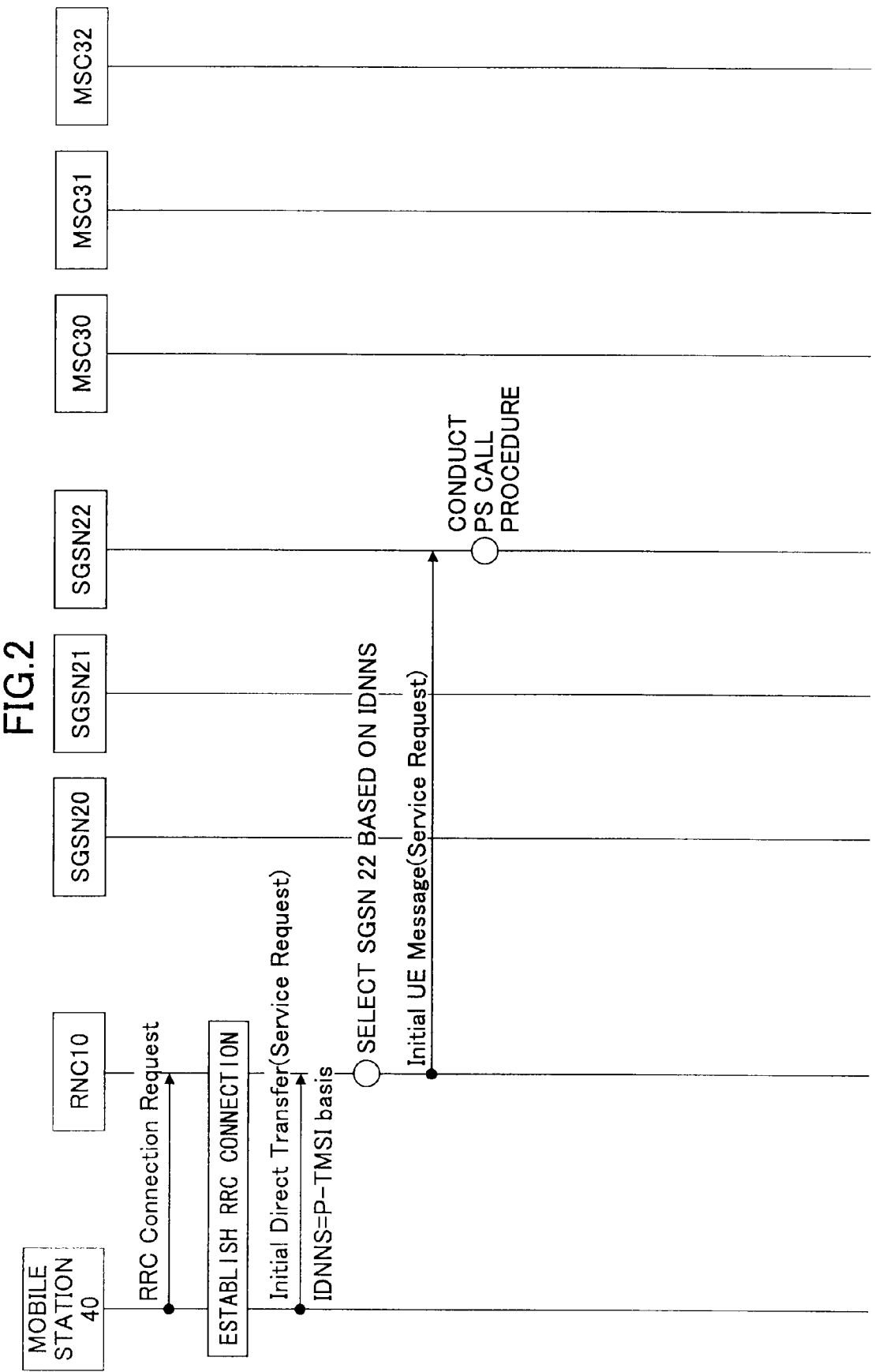
FIG. 2 is a sequence diagram illustrating a PS communication initiation procedure by a mobile station after the attach procedure in FIG. 1.

FIG. 2 is a sequence diagram illustrating a PS communication initiation procedure by a mobile station after the attach procedure in FIG. 1. For simplicity, only the PS communication initiation procedure is illustrated in FIG. 2, but the CS communication initiation procedure can be also performed as well.

First, the mobile station 40 requests the RNC 10 to establish an RRC connection (RRC Connection Request). After establishing the RRC connection, the mobile station 40 transmits a PS call request signal to the RNC 10 (Initial Direct Transfer). A routing parameter (IDNNS) is set in the PS call request signal. If the mobile station 40 generates the routing parameter from the TMSI or the P-TMSI, the mobile station 40 extracts 10 bits from the 14th bit to the 23rd bit of the TMSI or the P-TMSI and sets the 10 bits as the routing parameter. As stated above, the NRI for a connecting CN node is included in the 10 bits. In this PS communication initiation procedure, the P-TMSI is set in the IDNNS, and the NRI for the SGSN 22 is included in the P-TMSI.

Upon receiving the PS call request signal, the RNC 10 determines the connecting SGSN with reference to the IDNNS. In this embodiment, the IDNNS is set in the 10 bits from 14th bit to 23rd bit in the P-TMSI. The RNC 10 stores the routing parameter "0000000010". Also, the RNC 10 stores correspondence between exchanges and NRIs in advance (FIG. 3). The RNC 10 identifies the SGSN 22 corresponding to the NRI as the serving CN node with reference to the correspondence. The RNC 10 transmits the PS call request signal to the identified SGSN 22 (Initial UE Message). In this manner, the PS call connection procedure is conducted at the SGSN 22.

According to the Iu-Flex scheme, as illustrated above, multiple exchanges may be present, and the load distribution and the fault tolerance can be improved by selecting appropriate exchanges.

[2. Mobile Communication System]

Figure 4:
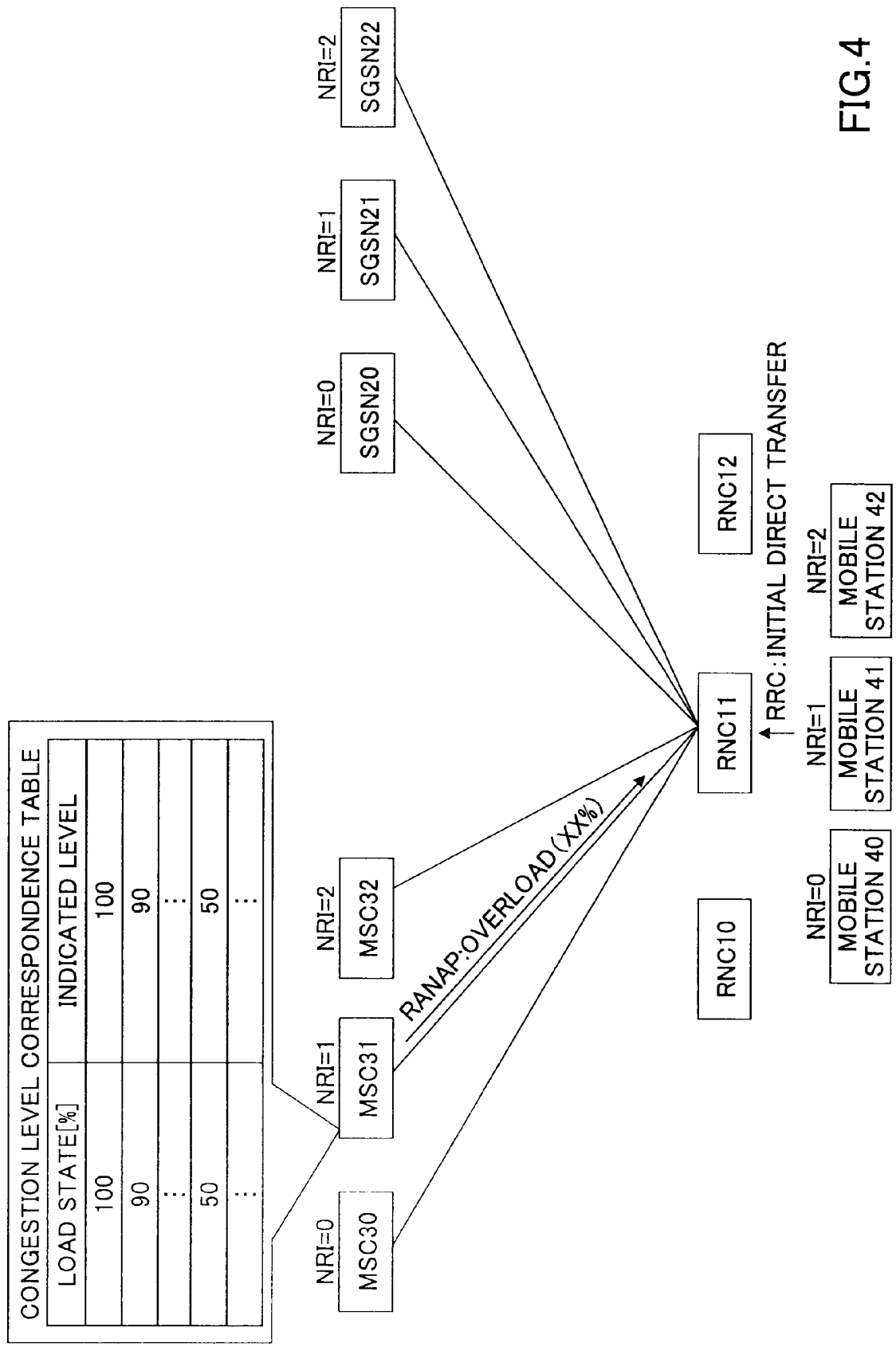
FIG. 4 schematically illustrates a mobile communication system according to one embodiment of the present invention.

FIG. 4 illustrates a mobile communication system according to one embodiment of the present invention. The mobile communication system includes multiple exchanges (MSCs 30-32 and SGSNs 20-22), radio network controllers (RNCs 10-12) connected to the multiple exchanges and mobile stations (40-42). For simplicity, radio base stations provided between the mobile stations and the RNCs are omitted.

Each exchange performs some operations in the core network of the mobile communication system including subscriber information management such as subscriber profile, mobility management, incoming and outgoing call control, charge control and QoS control. The mobile stations 40-42 are located under the RNC 11.

The RNCs 10-12 mainly manage radio resources. In this embodiment, as stated below, transferring entities of call connection signals are determined depending on congestion levels of the exchanges. In the illustrated embodiment, only the RNC 11 is connected to the multiple exchanges, but the RNCs 10 and 11 are actually connected to the multiple exchanges.

The mobile stations 40-42 may be any appropriate user equipment having communication capabilities, but not limited to, such as a mobile phone, an information terminal, a PDA or a mobile personal computer.

[3. RNC]

Figure 5:
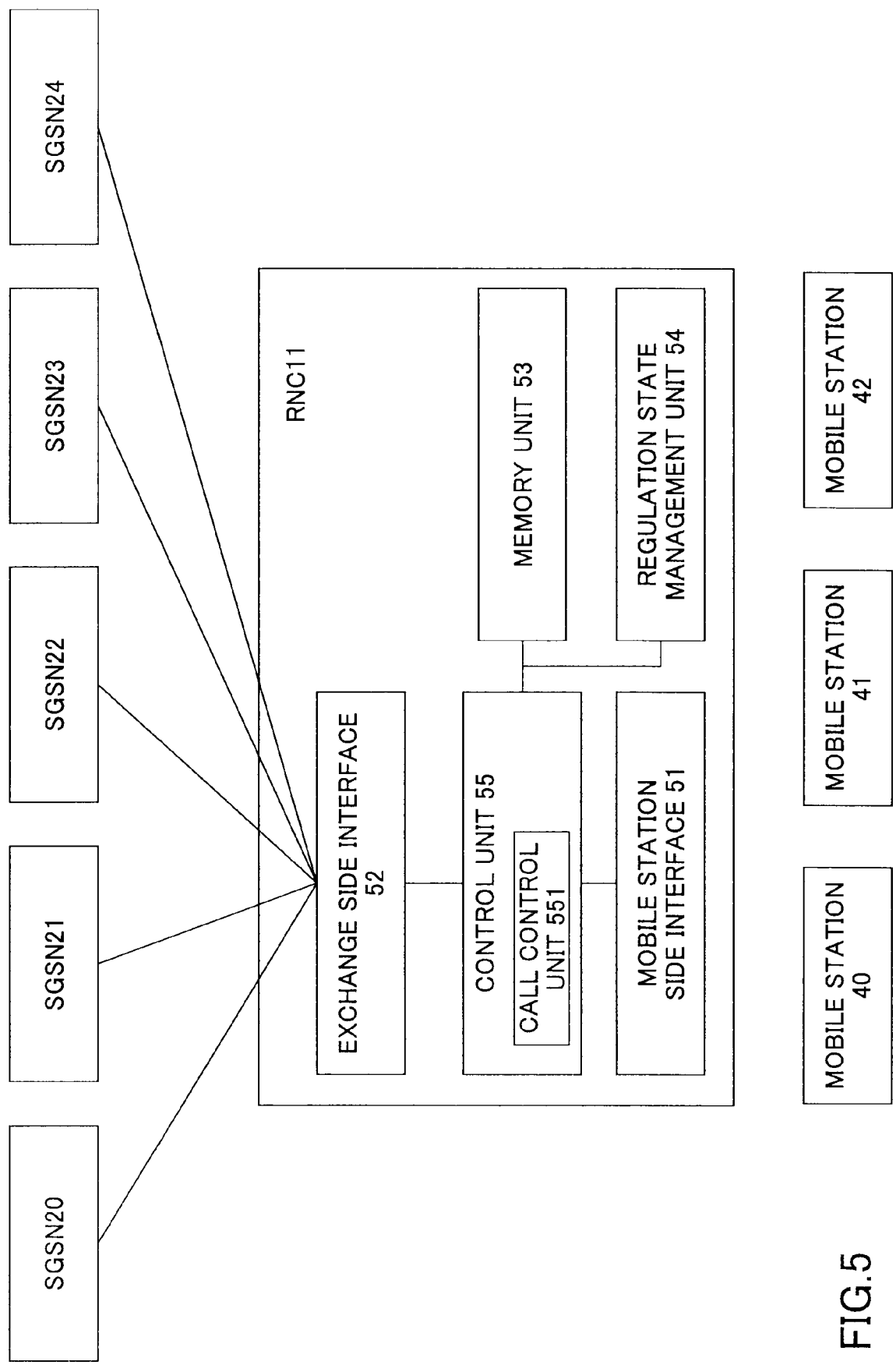
FIG. 5 is a block diagram illustrating an RNC according to one embodiment of the present invention.

FIG. 5 illustrates a radio network controller (RNC) according to one embodiment of the present invention. This RNC can be used as the RNCs 10-12 in FIG. 4. For simplicity, only SGSNs are illustrated as the exchanges, but the RNC may be connected to one or more MSCs.

The RNC 11 includes a mobile station side interface 51, an exchange side interface 52, a memory unit 53, a restriction state management unit 54 and a control unit 55. The control unit 55 includes a call control unit 551. Note that functional components in the RNC 11 particularly relevant to this embodiment are illustrated in FIG. 5.

The mobile station side interface 51 is an interface for communicating with the mobile stations 40-42 via a not-illustrated radio base station. For example, the mobile station side interface 51 is configured to establish RRC connections (radio connections) to the mobile stations in the communication initiation procedure by the mobile stations.

The exchange side interface 52 is an interface for communicating with various exchanges. For example, the exchange side interface 52 serves as an interface in transmission of location registration request signals and/or call request signals from the mobile stations to the exchanges.

The memory unit 53 stores data, parameters, variables and other information items for use in the RNC 11. For example, the memory unit 53 stores information indicative of TMSIs and P-TMSIs transmitted from the mobile stations. When the TMSIs and the P-TMSIs are changed upon updating of location registration areas, the changed TMSIs and P-TMSIs are overwritten in the memory unit 53.

The restriction state management unit 54 stores or manages congestion levels reported from the respective exchanges to determine congestion states of the exchanges. As stated below, the congestion levels of the respective exchanges may be managed depending on different types of call connection signals transmitted from the mobile stations. The congestion level is measured at the exchange and reported to the RNC periodically or as needed. As illustrated as "Congestion Level Correspondence Table" in FIG. 4, several congestion levels are predefined corresponding to different load states. The exchange reports the congestion level corresponding to its own load state to the RNC. The term "load state" used herein means an indicator of the amount or extent of congestion. More specifically, the congestion level reported from the exchange to the RNC indicates a required reduction amount of call connection signals to be subsequently transferred from the RNC to the exchange, that is, what percentage or ratio of the call connection signals the exchange requires the RNC to transfer to other exchanges. In other words, the exchange can indicate not only whether it is congested but also detailed information such as how much it is congested or what percentage of the incoming signal flow should be accepted to avoid congestion. For example, it is assumed that the load state of the SGSN 20 is equal to 70% and the congestion level corresponding to the load state is reported to the RNC 11. In this case, the RNC 11 transfers 70% of call connection signals destined from mobile stations for the SGSN 20 to other exchanges (SGSNs 21-24) and transfers the remaining 30% of call connection signals to the SGSN 20. The restriction state management unit 54 manages the congestion levels and returns the congestion levels of the exchanges in response to requests from the control unit 55 or the call control unit 551.

The control unit 55 controls operations of functional elements in the RNC 11 and performs management and makes determinations necessary for control. For example, in response to receipt of RRC messages from the mobile stations, the control unit 55 makes determination as to whether the TMSI is indicated, determination as to whether the IDNNS is indicated, determination of connecting domains (including determination as to a default exchange) and others.

The call control unit 551 performs call control together with general-purpose control in the control unit 55. In this embodiment, the call control unit 551 asks the restriction state management unit 54 for the congestion levels of exchanges, determines to which CN nodes call connection signals are transferred from the mobile stations and indicates the determined CN nodes to the exchange side interface 52. Although the call control unit 551 is illustrated as one component of the control unit 55, this is not essential to the present invention. The call control unit 551 may be implemented in any other appropriate form.

[4. First Exemplary Operation]

In the mobile communication system as illustrated in FIG. 4, an exemplary operation is performed for the RNC 11 to obtain the congestions levels of CN nodes and determine to which of the CN nodes the RNC 11 transfers a call connection signal from the mobile station 41. In the illustrated embodiment, MSCs are illustratively described, but similar operations can be also applied to SGSNs.

Figure 6:
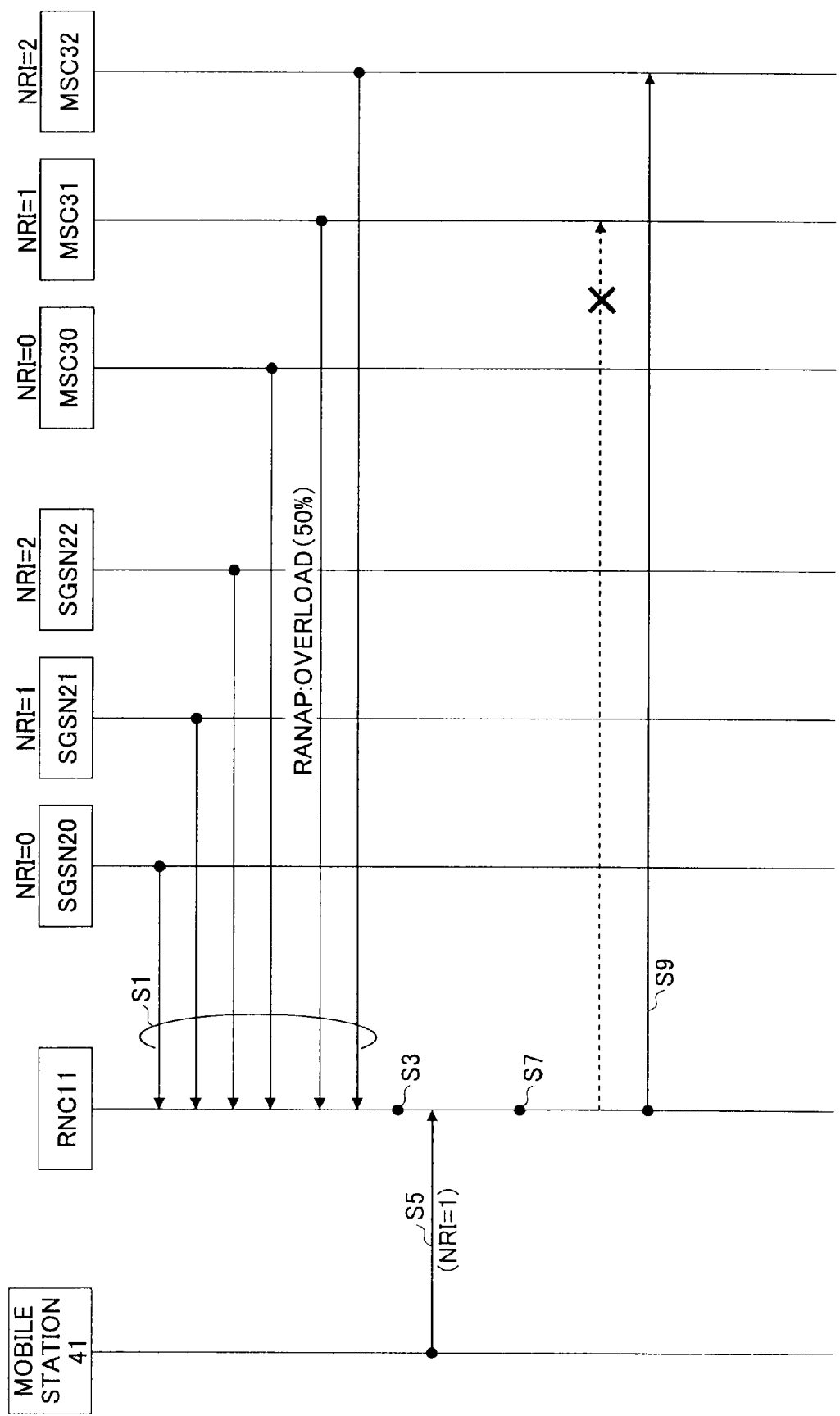
FIG. 6 is a sequence diagram illustrating an exemplary first operation according to one embodiment of the present invention.

FIG. 6 is a sequence diagram illustrating an exemplary first operation according to one embodiment of the present invention. Each of the exchanges (MSCs 30-32 and SGSNs 20-22) measures its own congestion state. The exchange uses a congestion level correspondence table as illustrated in FIG. 4 to determine the own congestion level. The congestion level correspondence table defines multiple stepwise load states and congestion levels corresponding to the respective load states. The relevant congestion level can be determined based on comparison between the load state and a threshold predefined for each load state.

At step S1, each exchange reports the congestion level indicative of its own congestion state to the RNC 11. In the embodiment as illustrated in FIG. 6, all exchanges report the congestion levels simultaneously, but it is not essential to the present invention. The congestion levels may be periodically reported. Alternatively, the congestion levels may be reported irregularly or upon request. The congestion level is reported at step S1 in a RANAP:OVERLOAD message, but such a specific message is not essential to the present invention. The congestion level may be reported in any other appropriate signal or message. Although not illustrated, the congestion levels of the respective exchanges (MCSs 30-32 and SGSNs 20-22) are reported to not only the RNC 11 but also the RNCs 10 and 12.

At step S3, the RNC 11 updates the received congestion levels of the respective exchanges. For convenience, it is assumed that only the MSC 31 is congested and its congestion level is equal to 50%. The restriction state management unit 54 in the RNC 11 manages these congestion states for the individual exchanges (for different types of call connection signals as needed).

At step S5, the RNC 11 receives a call connection signal for a location registration request from the mobile station 41.

At step S7, in response to receipt of the location registration request, the RNC 11 determines to which connecting exchange the call connection signal is to be transferred. The call control unit 551 in the RNC 11 identifies the intended connecting exchange with reference to an NRI value in the received call connection signal (RRC: Initial Direct Transfer). It is assumed that the NRI for the intended connecting exchange is set to "1" (MSC 31). The call control unit 551 in the RNC 11 asks the restriction state management unit 54 for the congestion levels of the respective exchanges, and the restriction state management unit 54 returns the congestion levels of the respective exchanges. Although the intended exchange in the call connection signal is the MSC 31 (NRI=1), the MSC 31 is currently congested. Since the congestion level is equal to 50%, the call control unit 551 controls to transfer 50% of the call connection signals destined for the MSC 31 to other exchanges and the remaining 50% to the MSC 31. In other words, the amount of call connection signals corresponding to the congestion level is rerouted to other CN nodes. The call control unit 551 in the RNC 11 determines to which CN nodes the call connection signals destined for the MSC 31 are transferred based on the ratio or likelihood corresponding to the congestion levels. This determination may be made in any appropriate manner.

For example, a random number may be employed. Then, if a generated random number is odd, the call connection signal may be transferred to the MSC 31, and if the generated random number is even, the call connection signal may be transferred to other CN nodes. In this manner, the determination as to whether to connect to the congested MSC 31 may be made. In the case where the random number is even and the RNC 11 connects to other CN nodes, MSC 30 or MSC 32 are selected. Since these CN nodes are not congested, the call control unit 551 can determine the connecting CN node through random selection between the MSC 30 and 32.

Alternatively, the call control unit 551 may detect an exchange having a congestion level lower than that of the congested MSC 31 and determine the detected exchange as the connecting exchange. In the illustrated embodiment, the congestion level of the MSC 31 is equal to 50%, and the MSCs 30 and 32 are not congested. Accordingly, the MSC 30 or the MSC 32 may be determined as the connecting CN node. For convenience, it is assumed that the MSC 32 is determined as the connecting CN node.

At step S9, the RNC 11 transfers the call connection signal to the MSC 32. The MSC 32 issues the TMSI to the mobile station 41. In this TMSI, the NRI indicative of the MSC 32 is set. Subsequently, if the mobile station 41 issues a call request, the RNC 11 transfers a call connection signal from the mobile station 41 to the MSC 32. This is because the NRI in the TMSI attached to the call request (RRC: Initial Direct Transfer) is equal to "2" (NRI=2). In this manner, the load redistribution can be made among the MSCs 30-32.

According to this exemplary operation, the MSC 31 can receive a reduced amount of signal corresponding to the congestion level. As a result, it is possible to reduce the amount of signals immediately after the MSC 31 has fallen into the congestion state.

[5. Second Exemplary Operation]

Next, an exemplary CN node selection operation at an RNC in case of multiple congested CN nodes. The operation flow is similar to FIG. 6 except for step S7.

Figure 7:
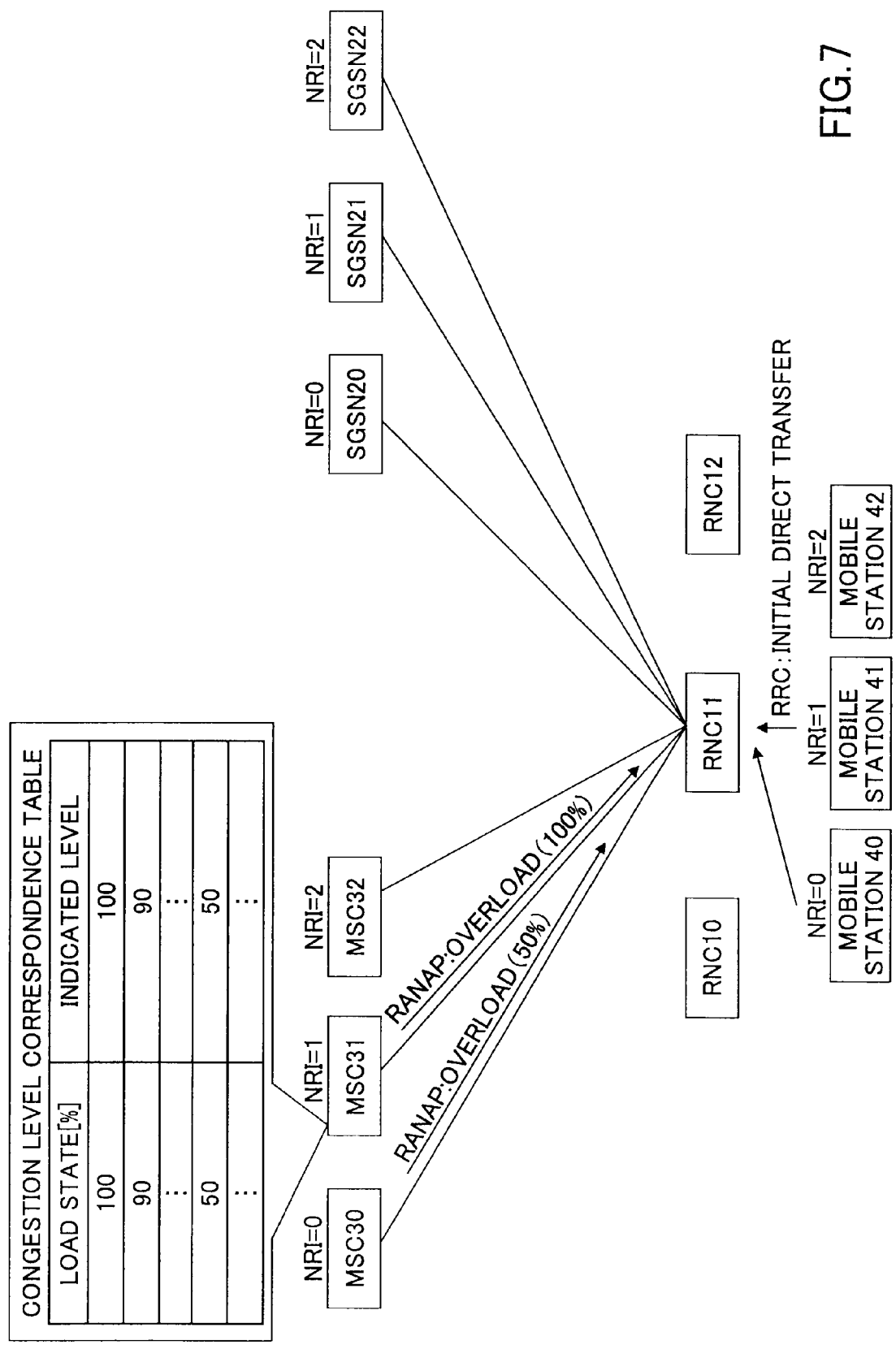
FIG. 7 schematically illustrates a mobile communication system according to one embodiment of the present invention.

FIG. 7 schematically illustrates a mobile communication system including multiple congested exchanges according to one embodiment of the present invention. FIG. 7 is similar to FIG. 4, but they particularly differ in that multiple exchanges MSCs 30 and 31 are congested, in that the congestion level "100%" is indicated, and in that call connection signals are transmitted from multiple mobile stations 40 and 41.

Figure 8:
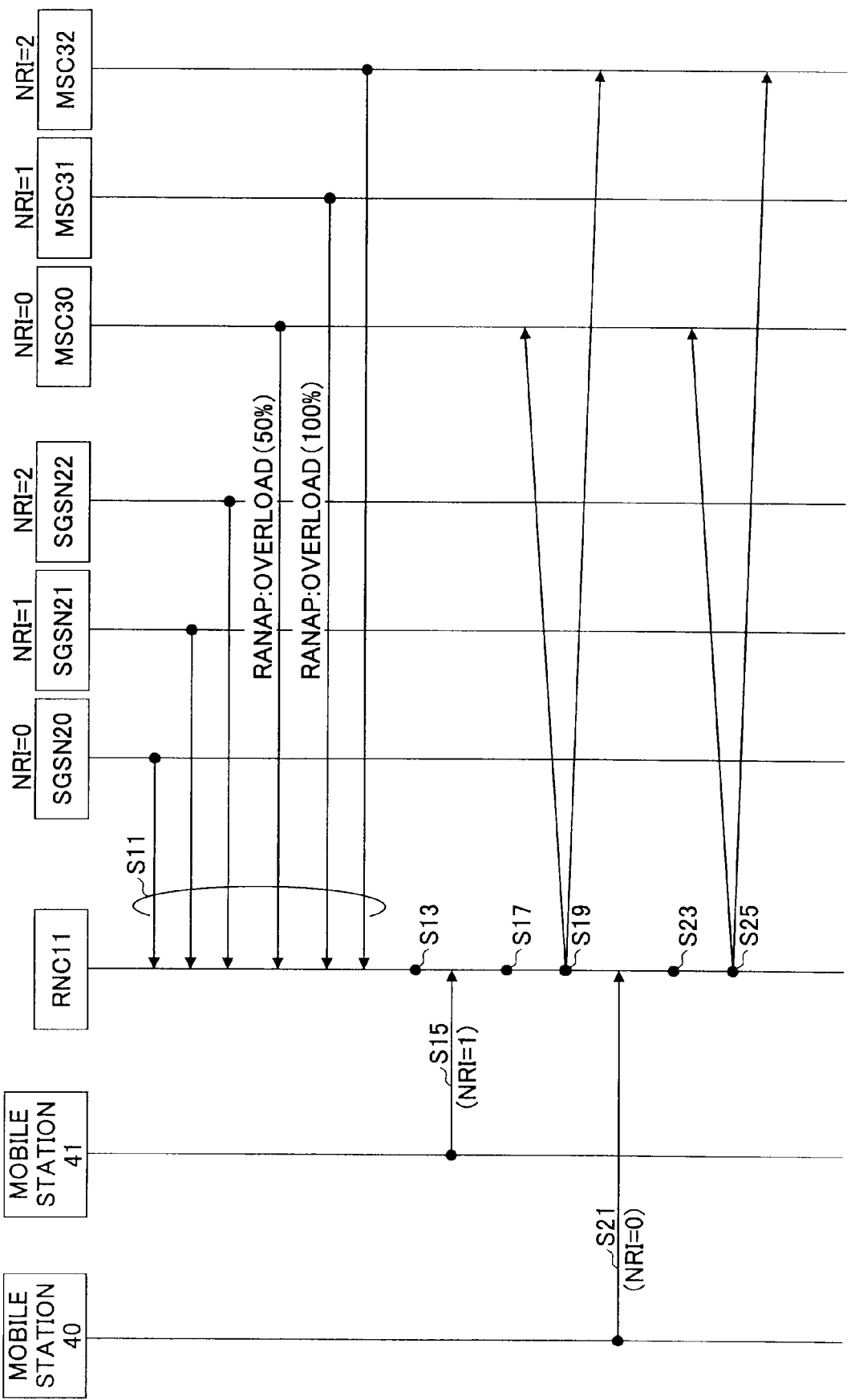
FIG. 8 is a sequence diagram illustrating an exemplary second operation according to one embodiment of the present invention.

FIG. 8 is a sequence diagram illustrating an exemplary second operation according to one embodiment of the present invention. At step S11, similar to step S1 in FIG. 6, each exchange reports the congestion level indicative of its own congestion state to the RNC 11. In the illustration, all the exchanges report the congestion levels simultaneously, but it is not essential to the present invention. The congestion levels may be reported periodically. Alternatively, the congestion levels may be reported irregularly or upon request. The MSC 30 reports the congestion level corresponding to the load state 50% to the RNC 11 in a RANAP:OVERLOAD message at step S11. Also, the MSC 31 reports the congestion level corresponding to the load state 100% to the RNC 11 in a RANAP:OVERLOAD message. On the other hand, the MSC 32 is not congested.

At step S13, the RNC 11 updates the received congestion levels for the respective exchanges. In the illustrated embodiment, the MSCs 30 and 31 are congested while the MSC 32 is not congested. The congestion level of the MSC 30 is equal to 50%, and the congestion level of the MSC 31 is equal to 100%. Similar to step S3 in FIG. 6, the restriction state management unit 54 in the RNC 11 manages the congestion state for each exchange (for different types of call connection signals as needed).

At step S15, the RNC 11 receives a call connection signal for a location registration request from the mobile station 41.

At step S17, in response to receipt of the location registration request, the RNC 11 determines to which connecting exchange the call connection signal is transferred. The call control unit 551 in the RNC 11 identifies the intended connecting exchange with reference to an NRI value in the received call connection signal (RRC: Initial Direct Transfer). It is assumed that the NRI of the intended connecting exchange is set to "1" (MSC 31). The call control unit 551 in the RNC 11 asks the restriction state management unit 54 for the congestion levels of the respective exchanges, and the restriction state management unit 54 returns the congestion levels of the respective exchanges. The intended exchange in the call connection signal is the MSC 31 (NRI=1), but the MSC 31 is currently congested. Since the congestion level of the MSC 31 is equal to 100%, 100% of the call connection signals destined for the MSC 31 are transferred to other exchanges. In other words, the MSC 31 is extremely congested and cannot accept the call connection signal at all. The call control unit 551 in the RNC 11 determines the connecting exchange (other than the MSC 31) for the call connection signals destined for the MSC 31 based on the ratio or likelihood corresponding to the congestion level. Similar to step S7 in FIG. 6, the connecting exchange may be determined in any appropriate manner.

For example, one exchange may be selected from exchanges having congestion levels lower that that of the MSC 31. The congestion level of the MSC 31 is equal to 100%, and the MSCs 30 and 32 have congestion levels lower than that of the MSC 31. Thus, these two exchanges can be candidates of the connecting exchanges. However, the MSC 32 is not congested while the MSC 30 is congested. The congestion level of the MSC 30 is equal to 50%. In this case, the MSC 32 may be determined as the connecting exchange according to a predefined likelihood calculated based on the congestion level, and the MSC 30 may be determined as the connecting exchange according to the remaining likelihood. Also, the connecting exchange may be determined randomly from the MSCs 30 and 32. Alternatively, the MSC 32 having the lowest congestion level may be determined as the connecting exchange. At step S19, the call connection signal is transferred to the determined connecting exchange (MSC 30 or 32).

At step S21, the RNC 11 receives the call connection signal for the location registration request from the mobile station 41.

At step S23, in response to receipt of the location registration request, the RNC 11 determines the connecting exchange to which the call connection signal is transferred. The call control unit 551 in the RNC 11 determines the intended connecting exchange with reference to an NRI value in the received call connection signal (RRC: Initial Direct Transfer). It is assumed that the NRI of the intended connecting exchange is equal to 0 (MSC 30). The call control unit 551 in the RNC 11 asks the restriction state management unit 54 for the congestion levels of the respective exchanges, and the restriction state management unit 54 returns the congestion levels of the respective exchanges. The intended exchange in the call connection signal is the MSC 30 (NRI=0), but the exchange is currently congested. Since the congestion level is equal to 50%, 50% of call connection signals destined for the MSC 30 are transferred to other exchanges, and the remaining 50% are transferred to the MSC 30. The call control unit 551 in the RNC 11 determines the connecting exchange for the call connection signals destined for the MSC 30 according to the ratio or likelihood corresponding to the congestion level. Similar to step S7 in FIG. 6, the connecting exchange may be determined in any appropriate manner.

For example, in the case of selection of exchanges other than the MSC 30, one exchange may be selected from exchanges having congestion levels lower than that of the MSC 30. The congestion level of the MSC 30 is equal to 50%, and only one exchange has a congestion level lower than that of the MSC 30. Accordingly, that exchange may be determined as the connecting exchange. The congestion level of the MSC 31 is equal to 100%, and thus the MSC 31 is not included in the connecting exchange candidates. If multiple exchanges have congestion levels lower than that of the MSC 30, one of the exchanges may be determined as the connecting exchange depending on the respective congestion levels. Alternatively, the exchange having the lowest congestion level may be determined as the connecting exchange. Since the connecting exchange is selected from exchanges having congestion levels lower than the reported congestion level of the congested exchange, the efficient load distribution can be fulfilled rapidly.

At step S25, the call connection signal is transferred to the determined connecting exchange (MSC 30 or 32).

Meanwhile, when the load is redistributed to an exchange having a lower congestion level, there is a possibility that all exchanges may be congested, and accordingly it is difficult to further reduce the load of the exchange having the lowest congestion level. In this case, the access may be restricted to reject a ratio of call connection signals corresponding to the lowest congestion level. For example, it is assumed that the three exchanges MSCs 30-32 have the congestion levels "50%", "100%" and "10%", respectively, in the illustrated embodiment. In this case, 10% of call connection signals destined for the MSC 32 are rejected. In this manner, the smallest number of call connections can be rejected through the access restriction.

[6. Third Exemplary Operation]

It may not be preferable that the above-mentioned methods of rerouting call connection signals during congestion are applied to all the call connection signals from mobile stations. For example, a connection request for a connecting exchange intentionally specified through a user's manipulation (mobile station), such as audio services, may be rerouted to other unintended exchanges. In this case, since the rerouting exchange has no subscriber information associated with the mobile station, the call connection fails once, and accordingly location registration must be retried. From the viewpoint of service quality, it is not preferable that the user experiences such connection failure.

Meanwhile, in order to address the above-mentioned problem, it may be conceived to limit types of call connection signals allowed to be rerouted to other exchanges to a type of call connection signals related to the location registration.

This is because the location registration related call connection signals are suitable for reroute due to user's unconsciousness. In such a limitation, even if the congestion level of an exchange is crucially high, the other types of call connection signals, such as connection requests for audio services, would not be rerouted but be transferred to the congested exchange. For this reason, there is a risk that the load cannot be redistributed for urgent avoidance. Rather, in such an urgent case, it is beneficial to reroute the call connection signals to other exchanges regardless of types of call connection signals.

On the other hand, there may be some problem in the case where the location registration related call connection signals are rerouted to other exchanges. In case of initial location registration, that is, in the case where a location registration request is transferred to an exchange having no subscriber information, in response to receipt of the initial location registration request, the exchange generates the subscriber information, and the earlier exchange retaining the subscriber information until that time deletes the subscriber information. Even if the above-mentioned reroute is conducted with limit to the location registration related call connection signals, this operation would be conducted between these exchanges. In case of periodically confirmed location registration instead of the initial location registration, if the same exchanges perform that operation, the above interactions between the exchanges do not occur. However, if the exchanges are changed as a result of reroute, the interaction for the subscriber information between the exchanges must be performed even in the case of periodic location registration as in the case of initial location registration, which may increase the processing load. The third exemplary operation according to one embodiment of the present invention can address the above-mentioned problem.

Figure 9:
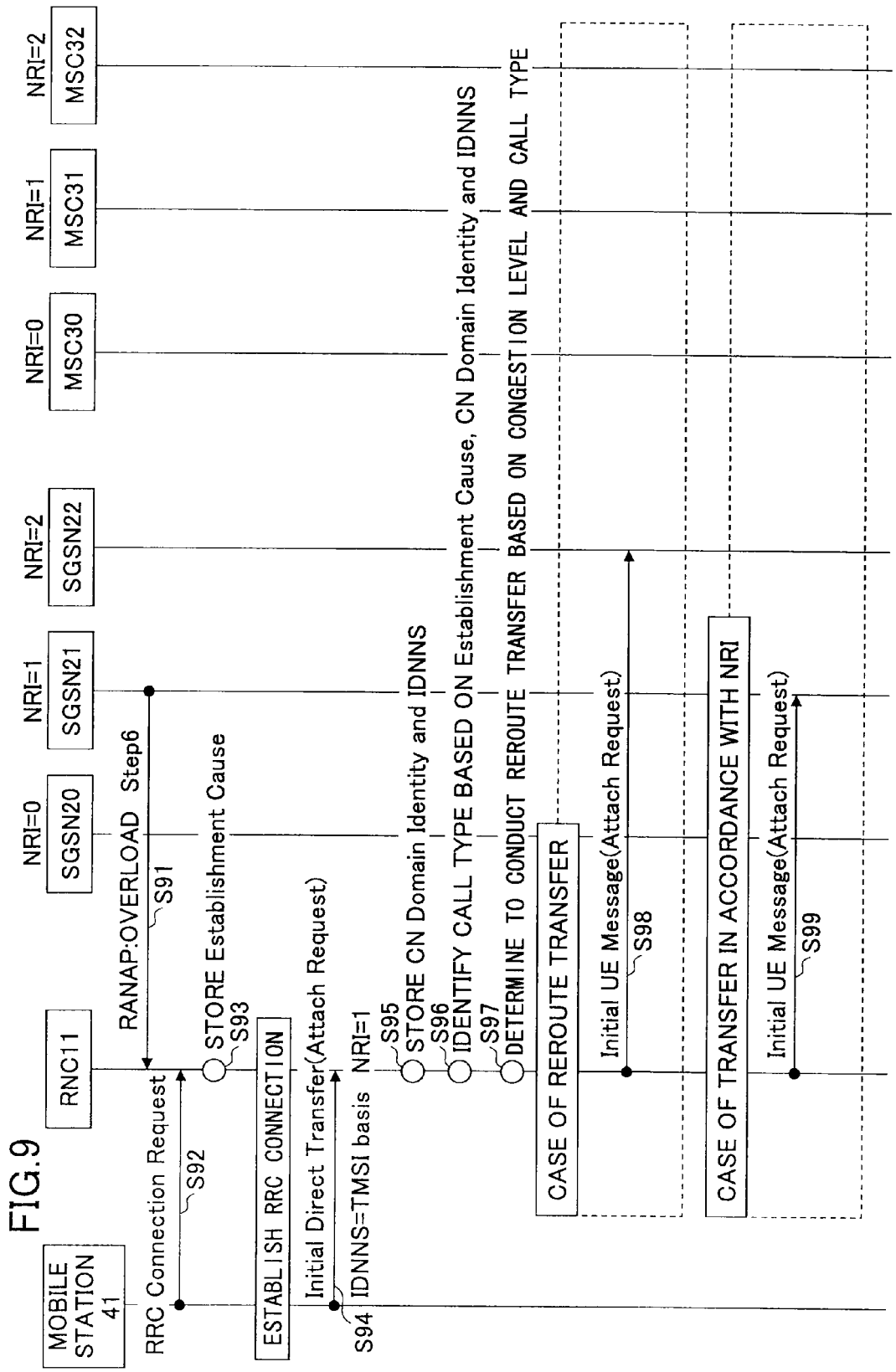
FIG. 9 is a sequence diagram illustrating an exemplary third operation according to one embodiment of the present invention.

FIG. 9 is a sequence diagram illustrating an exemplary third operation according to one embodiment of the present invention.

At step S91, the SGSN 21 reports a congestion level to the RNC 11 in a RANAP:OVERLOAD message. Although other exchanges also report their own congestion levels to the RNC 11, it is not illustrated for simplicity. In the illustrated embodiment, the SGSN 21 is congested.

At step S92, the RNC 11 receives an RRC message (RRC Connection Request) as a call connection signal from the mobile station 41.

At step S93, the RNC 11 extracts and stores an "Establishment Cause" from the received RRC message. The "Establishment Cause" is an information item for identifying whether the call relates to location registration.

After the establishment of the RRC connection, at step S94, the RNC 11 receives a call connection signal (Initial Direct Transfer) from the mobile station 41. For convenience, it is assumed that this call connection signal is an attach request signal (Attach Request). The RNC 11 detects an NRI from the routing parameter (IDNNS) attached to the call connection signal and identifies an exchange intended as a connecting exchange. The call control unit 551 in the RNC 11 asks the restriction state management unit 54 for the congestion levels for all exchanges to determine the congestion level for the connecting exchange corresponding to the NRI. For convenience, it is assumed that NRI=1 (SSGN 21).

At step S95, the RNC 11 extracts and stores "CN Domain Identity" and "IDNNS" from the received message. The "CN Domain Identity" indicates whether the connecting exchange is in the CS domain or in the PS domain. In case of location registration related call connection signals, the RNC 11 can determine whether the location registration corresponds to initial location registration (attach) or periodic location registration based on routing information (Routing Basis) in the "IDNNS". In addition, the RNC 11 can identify whether the location registration is due to migration between location areas (LAs) or routing areas (RAs).

At step S97, the RNC 11 determines the type of the call connection signal received from the mobile station. Through steps S93, S95 and S96, the RNC 11 has stored the identification information (Establishment Cause) indicative of whether the call relates to the location registration, the information (CN Domain Identity) indicative the domain for the exchange and the routing parameter information (IDNNS).

There are many possible combinations of "Establishment Cause" and "IDNNS" in both the CS domain and the PS domain. However, only the determination as to whether the call connection signal relates to the location registration and the determination as to whether subscriber information is exchanged between exchanges in the case of the location registration (whether the location registration is due to the inter-LA/RA migration or whether the location registration relates to the attach location registration or the periodic location registration) are required to determine the call type, resulting in a relatively smaller number of combinations. From this viewpoint, according to the exemplary third operation, the above combinations are stored in the RNC 11 in advance, which enables the RNC 11 to identify the call type from the mobile station.

The RNC 11 stores correspondence between call types and reroute initiation levels as illustrated in FIG. 10 beforehand. In the correspondence, the call types are classified into several patterns such as patterns A-D. The RNC 11 identifies the pattern associated with a call connection signal of interest and determines the reroute initiation congestion level corresponding to the identified pattern. The call control unit 551 in the RNC 11 can determine whether the received call connection signal is to be rerouted from a congested exchange to other exchanges or whether the call connection signal is to be transferred to the congested exchange in accordance with the specified NRI with reference to the correspondence. In this exemplary operation, different congestion levels for initiating reroute are assigned corresponding to the different patterns.

At step S98, the RNC 11 subsequently transfers the call connection signals to the rerouting exchange in accordance with the reroute determination. Alternatively, at step S99, the RNC 11 transfers the call connection signals to the exchange corresponding to the specified NRI.

For example, it is assumed that patterns A, B, C and D are associated with "location registration call for the inter-LA/RA migration", "attach or periodic location registration call", "normal call irrelevant to location registration" and "call other than patterns A-C", respectively. Then, it is assumed that the reroute initiation congestion levels for the patterns A-C are assigned to "10%", "50%" and "90%", respectively.

In the case where the type of call connection signal is associated with "location registration call for the inter-LA/RA migration" (pattern A), the reroute is initiated upon the congestion level reaches 10%. As stated above, the user is unconscious of the location registration and accordingly the location registration is suitable for the reroute. Thus, for the call connection signal associated with such a type of location registration, the reroute may be positively conducted, and the reroute initiation congestion level may be set to a relatively lower value.

In the case where the type of call connection signal is associated with "attach or periodic location registration call" (pattern B), the reroute is not initiated until the congestion level reaches 50%. Similar to pattern A, the location registration can be performed unconsciously to the user. In case of the attach or periodic location registration, however, modification of an in-use exchange may cause additional load due to exchange of the subscriber information between the exchanges. For this reason, the reroute initiation congestion level for pattern B may be set to a value relatively higher than pattern A.

In the case where the type of call connection signal is associated with "normal call irrelevant to location registration" (pattern C), the reroute is not initiated until the congestion level reaches 90%. In case of a normal call such as a voice call, it is not preferable to change the connecting exchange into an exchange having no subscriber information. For this reason, it is preferable that the normal call have as low a likelihood as possible of being rerouted. Accordingly, the reroute initiation congestion level may be set to a relatively higher value such as 90%.

In the case where the type of call connection signal is associated with "call other than patterns A-C" (pattern D), the reroute is not initiated regardless of the congestion level.

In this manner, it is possible to perform the load distribution suitable for situations by predefining the reroute initiation congestion levels for different patterns. For example, when an exchange is even slightly congested, the rerouting is initiated but is limited to the inter-LA/RA location registration call. This is because that location registration does not cause the user to experience connection failure and there is no interchange of the subscriber information between the exchanges. On the other hand, when the exchange is highly congested, the attach and periodic location registration call is also targeted for the reroute. In this case, it is more beneficial to eliminate the congestion even if some amounts of additional interaction occur between the exchanges. Further, when the exchange is extremely congested, the normal call is also targeted for the reroute to provide elimination of the congestion to the highest priority. In this manner, according to the exemplary operation, the reroute initiation congestion level can be appropriately set depending on types of call connection signals, which can eliminate the congestion effectively.

As stated above, the RNC according to the embodiments of the present invention can detect congested exchanges and reroute an amount of signals corresponding to the congestion level to other exchanges. As a result, the RNC can manage the respective congestion state of multiple CN nodes and distributes load appropriately corresponding to the respective congestion levels. Also, the exchange can inform the RNC of not only whether it is congested but also how much it is congested and/or whether what amount of incoming signals should be rerouted to avoid congestion. Based on the information, the RNC can redistribute the load of the exchanges appropriately corresponding to the extent of congestion. As a result, the exchange can eliminate the congestion effectively before reaching its capability limit.

Although the present invention has been described with reference to the specific embodiments, these embodiments are simply illustrative. Variations, modifications, alterations and replacements may be made by those skilled in the art without departing from the scope of the present invention. For example, the present invention may be applied to any appropriate mobile communication system where multiple exchanges are connected to a radio network station (RNC). For example, the present invention is applicable to a W-CDMA based system, a HSDPA/HSUPA based system and others. Although specific values are used in the above descriptions to facilitate the understanding of the present invention, the values are just examples, and different values may also be used unless otherwise mentioned. The distinctions between the embodiments are not essential for the present invention, and the embodiments may be used individually or in combination. Also, subject matter described in one embodiment may be applied to subject matter in another embodiment unless they are contradictory. Although functional block diagrams are used to describe apparatuses in the above embodiments, the apparatuses may be implemented by hardware, software, or a combination of them. Software may be stored in any appropriate storage medium such as a random access memory (RAM), a flash memory, a read only memory (ROM), an EPROM, an EEPROM, a register, a hard disk (HD), a removable disk, or a CD-ROM.

The present application is based on Japanese Priority Application No. 2010-139131 filed on Jun. 18, 2010, the entire contents of which are hereby incorporated herein by reference.

What is claimed is:

1. A radio network controller connected to multiple exchanges in a mobile communication system, comprising:
an exchange side interface configured to communicate with the multiple exchanges;
a mobile station side interface configured to receive a call connection signal from a mobile station via a radio base station;
a management unit configured to manage congestion levels indicative of congestion states of the respective exchanges; and
a control unit,
wherein
the exchange side interface acquires the congestion levels from the respective exchanges,
the control unit determines to transfer a predefined ratio of call connection signals destined for an exchange having a higher congestion level to an exchange having a lower congestion level, the ratio being predefined corresponding to the congestion level, and
if all the multiple exchanges are congested, the control unit determines to initiate access restriction such that a predefined ratio of call connection signals corresponding to the lowest congestion level in the multiple exchanges are rejected.

2. The radio network controller as claimed in claim 1, wherein the exchange side interface transfers the remaining amount of call connection signals other than the ratio of call connection signals to the exchange having the higher congestion level in accordance with the control unit.

3. The radio network controller as claimed in claim 1, wherein
the management unit manages signals to be transferred to the exchange having the lower congestion level for each type of call connection signals, and
the control unit determines a connecting exchange of the call connection signals corresponding to a type of call connections.

4. A mobile communication system, comprising:
multiple exchanges; and
a radio network controller connected to the multiple exchanges,
wherein the radio network controller comprises:
an exchange side interface configured to communicate with the multiple exchanges;
a mobile station side interface configured to receive a call connection signal from a mobile station via a radio base station;
a management unit configured to manage congestion levels indicative of congestion states of the respective exchanges;

a control unit,
wherein
the respective exchanges reports the congestion levels to the radio network controller, and the control unit determines to transfer a predefined ratio of call connection signals destined for an exchange having a higher congestion level to an exchange having a lower congestion level, the ratio being predefined corresponding to the congestion level, and if all the multiple exchanges are congested, the control unit determines to initiate access restriction such that a predefined ratio of call connection signals corresponding to the lowest congestion level in the multiple exchanges are rejected.

5. The mobile communication system as claimed in claim 4, wherein the exchange side interface transfers the remaining amount of call connection signals other than the ratio of call connection signals to the exchange having the higher congestion level in accordance with the control unit.

6. The mobile communication system as claimed in claim 4, wherein
the management unit manages signals to be transferred to the exchange having the lower congestion level for each type of call connection signals, and the control unit determines a connecting exchange of the call connection signals corresponding to a type of call connections.

7. A method in a mobile communication system including multiple exchanges and a radio network controller connected to the multiple exchanges, comprising:
the radio network controller acquiring congestion levels indicative of congestion states of the respective exchanges, managing the congestion levels of the respective exchanges and receiving a call connection signal from a mobile station via a radio base station; and the radio network controller transferring a predefined ratio of call connection signals destined for an exchange having a higher congestion level to an exchange having a lower congestion level, the ratio being predefined corresponding to the congestion level, wherein if all the multiple exchanges are congested, the radio network controller determines to initiate access restriction such that a predefined ratio of call connection signals corresponding to the lowest congestion level in the multiple exchanges are rejected.

* * * * *